No. 667,130. Patented Jan. 29, 1901.
E. M. HEWLETT & H. F. T. ERBEN.
LOAD EQUALIZING APPARATUS FOR DYNAMO ELECTRIC MACHINES.
(Application filed Mar. 27, 1900.)
(No Model.) 2 Sheets—Sheet 1.
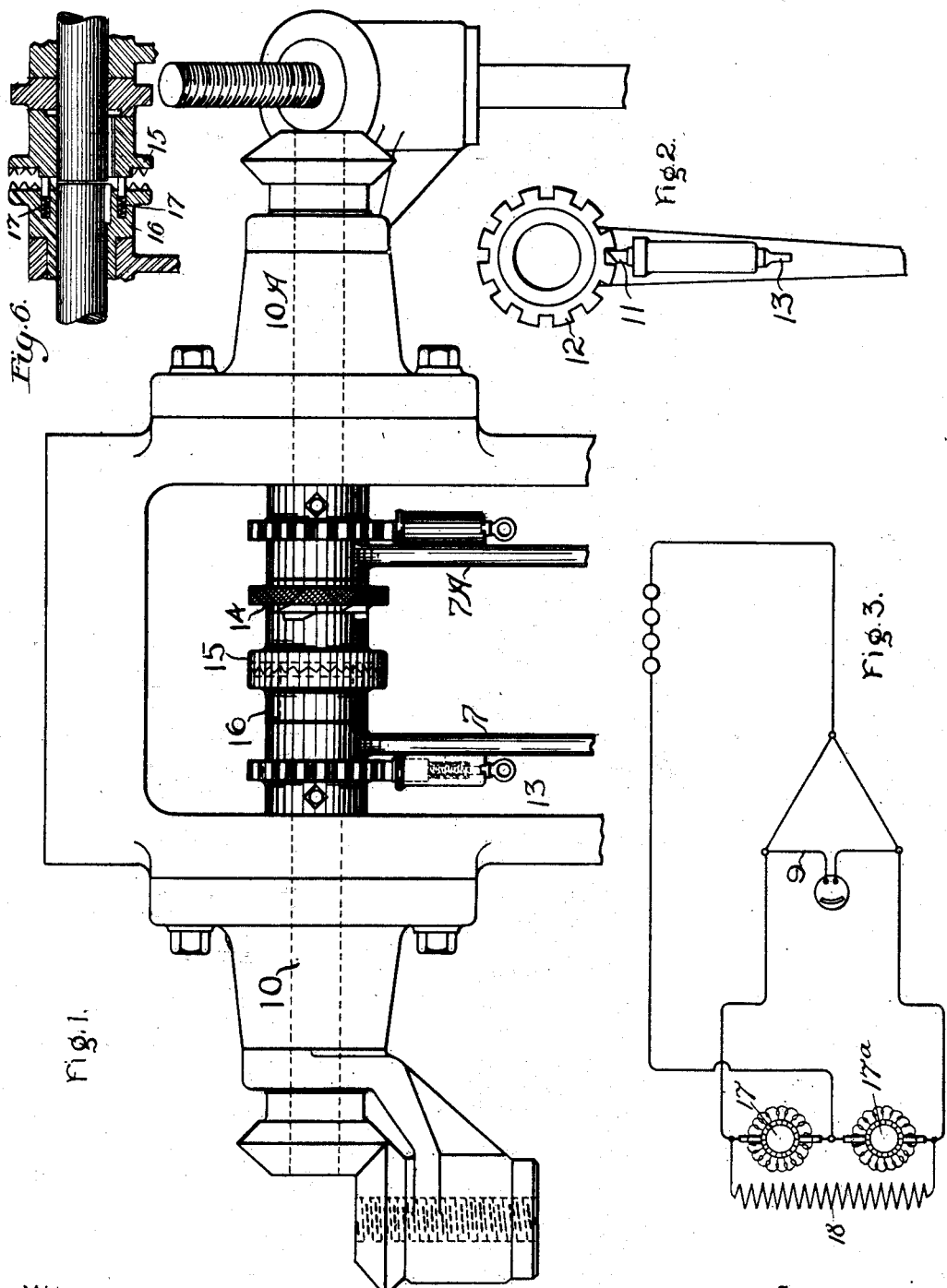
Witnesses
Inventors
Hermann F. T. Erben;
Edward M. Hewlett.
by Albert G. Davis.
Atty.

No. 667,130. Patented Jan. 29, 1901.
E. M. HEWLETT & H. F. T. ERBEN.
LOAD EQUALIZING APPARATUS FOR DYNAMO ELECTRIC MACHINES.
(Application filed Mar. 27, 1900.)
(No Model.) 2 Sheets—Sheet 2.
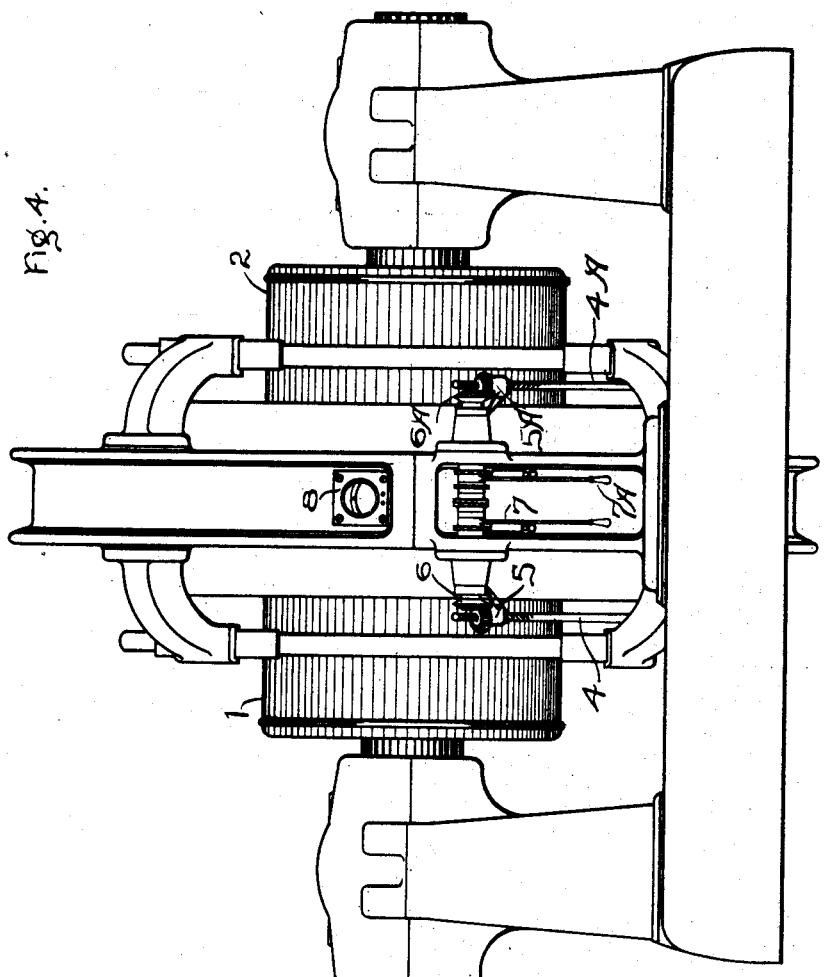
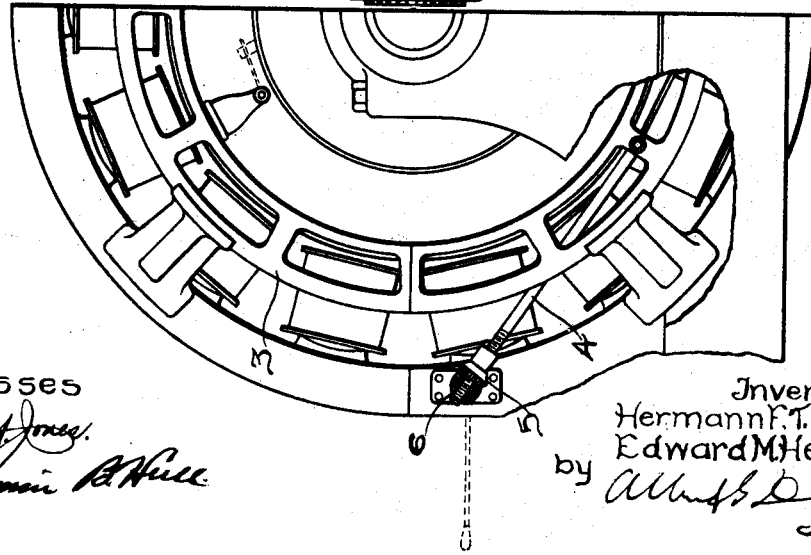
Witnesses
Inventors
Hermann F. T. Erben;
Edward M. Hewlett.
by Albert G. Davis
Atty.

UNITED STATES PATENT OFFICE.

EDWARD M. HEWLETT AND HERMANN F. T. ERBEN, OF SCHENECTADY, NEW YORK, ASSIGNORS TO THE GENERAL ELECTRIC COMPANY, OF NEW YORK.

LOAD-EQUALIZING APPARATUS FOR DYNAMO-ELECTRIC MACHINES.

SPECIFICATION forming part of Letters Patent No. 667,130, dated January 29, 1901.

Application filed March 27, 1900. Serial No. 10,361. (No model.)

*To all whom it may concern:*

Be it known that we, EDWARD M. HEWLETT and HERMANN F. T. ERBEN, citizens of the United States, residing at Schenectady, county of Schenectady, State of New York, have invented certain new and useful Improvements in Load-Equalizing Apparatus for Dynamo-Electric Machines, (Case No. 1,586,) of which the following is a specification.

This invention relates to commutators for dynamo-electric machines or other generators of direct current giving a large current output. In many cases it is desirable to operate two independent generators or a generator provided with two independent commutators by a single prime mover, the output of the several commutators being connected in multiple, so as to divide the load between the several parts of a single machine. Thus each commutator carries a fractional part of the amperage of the generator, and heating is cut down. It is found in practice, however, that by variations of its brush-contact or from other causes the commutators do not maintain uniformity of load, as is desirable, and one is apt to deliver more current than the other. It is the object of our invention to prevent this result and to permit the brushes of each or both commutators to be shifted, so as to maintain a desired relation in the external circuit.

In carrying out the invention we mount on the generator an adjusting-lever for each commutator and provide connections by which both sets of brushes may be adjusted as a unit or either set alone. In order to render this adjustment accurate and convenient, we provide on the frame of the machine an ampere-meter in circuit and connected in an electric bridge in such a way that when the commutators equally divide the load no current will flow through the instrument, and it will give the zero indication; but upon a deviation from equality of load division current will flow across the bridge-wire in one direction or the other, thus giving a deflection to one side or the other of the zero-mark, showing the operator how to adjust the brushes.

Our invention therefore comprises a generator, whether a dynamo-electric machine, a rotary converter, or other type of direct-current machine, provided with a plurality of commutators and means for effecting a uniform division of load between or among the commutators.

It comprises also other features, the novelty of which will be specifically pointed out hereinafter.

In the accompanying drawings, which illustrate our invention, Figure 1 is a side elevation of a portion of a dynamo-electric machine embodying our improvements. Fig. 2 is a detail view of one of the adjusting-levers. Fig. 3 is a diagram showing the circuit arrangement of the indicating instrument. Fig. 4 is a side elevation of a complete machine. Fig. 5 is a partial end elevation of a complete machine, and Fig. 6 is a detail view of the brush-adjusting apparatus.

1 and 2 represent two commutators in operative relation to a common armature provided with a common or with independent winding. We have shown a multipolar machine the brushes of which are supported on an adjustable ring 3, as is now the common engineering practice in generators of large output. One of these rings is mounted in operative relation to each commutator upon the field-magnet frame if a single machine be employed, or upon different frames if more than one field-magnet frame be employed, and carry the brushes which bear upon the commutators in a manner now common in the art. Each of these rings is connected with a pivoted rod, as 4, (see Fig. 5,) provided with a screw-thread at its end engaging a coöperating thread in a tubular bevel-gear 5 $5^a$, journaled to rotate in a frame swiveled on the frame of the machine, as indicated in Figs. 1, 4, and 5. Coöperating with the gear-wheel 5, which engages the threaded extremity of the rod 4, is the gear 6 $6^a$, mounted on a shaft turning in suitable bearings on the frame of the machine or machines.

We have shown the invention as applied to a single generator, though it is not limited to a single machine, but might be also applied to two machines connected through their commutators into a common distribution-circuit. In the single-machine organization shown we provide two operating-handles for the two sets of brushes, each controlled by an independent handle 7 7ª. The threads on the ends of the rods 4 4ª are right-handed and left-handed, respectively, so as to communicate a similar movement to the commutator-brushes by the same direction of movement of the controlling-handles. Mounted on the frame of the machine is an indicating instrument 8, the object of which is to show the condition of load on the two commutators. This might, within the range of operativeness, be two instruments connected in each circuit; but we prefer to render the instrument differential in its action and jointly responsive to the load on the two commutators. This might be accomplished also in a variety of ways, one of which has been shown in Fig. 3 and is preferred on account of its simplicity in admitting an instrument of standard manufacture. The instrument has a middle zero position and is connected, as shown in Fig. 3, in a bridge-wire 9 across brushes of like sign of the two commutators. In this figure, 17 17ª represent independent armature-windings moving in a common field 18. The brushes of the other sign are connected together and led to the other side of the distribution-circuit. Thus when the output of the two commutators is the same the potential at the ends of the bridge-wire in which the indicating instrument is included is the same and the index will remain at zero. If, however, one commutator delivers a higher potential than the other, the instrument will deflect on a definite side of the zero-mark, thereby indicating which commutator is delivering the higher potential and permitting the operator to make the necessary brush adjustment to bring them into equality. We prefer to arrange the adjusting device for the brushes so that either set of brushes may be shifted alone or both sets together, and to this end we provide two operating-levers 7 7ª, journaled on arbors 10 10ª, geared to the respective brush-shifting mechanism. Each operating-handle carries a spring-pressed pawl, as indicated at 11 in Fig. 2, normally depressed toward a ratchet-wheel 12, but capable of being withdrawn by a ring-handle 13 at the rear. A projection near the ring is adapted to engage a coöperating recess in the end of the case, as indicated at 13, and permits the pawl to be reversed when desired, and when shifted through an angle of one hundred and eighty degrees it will lock the ratchet-wheel 12 from movement in a reverse direction. The ratchet-wheel is mounted on a collar fastened to one of the arbors 10 or 10ª, and thus either set of commutator-brushes may be adjusted forward or backward, accordingly as the pawl 11 is in one position or the other. The pawls may be set in such a position that both sets of brushes will be similarly adjusted when the movement of the operating-handle 7 7ª is in the same direction, or they may be set for opposite directions of movement. In some cases it is desirable to adjust both brushes simultaneously and exactly alike. To permit this, we provide a clutch by which both sets of brushes may be operated by a single operating-handle. This clutch is shown in Fig. 1. A clutch-ring provided with teeth engaging coöperating depressions in a sliding clutch member 15, keyed on arbor 10, may be turned by means of a milled edge until its projections aline with the depressions. Coil-springs 17, nesting within the clutch member 16, then force the two members apart and disconnect both arbors 10 and 10ª. When, however, the ring 14 is turned to the position shown in Fig. 1, the projections ride out of the notches in the clutch member 15 and force the two clutch members into engagement. When in in this adjustment, a rotary movement imparted to either arbor by its operating-handle will shift both sets of brushes. By this means both sets of brushes may be adjusted until the current, as observed by an ammeter or other indicating instrument in circuit, is as desired. Thus either or both of two commutators discharging into a common circuit may have their load maintained uniform or in a definite relation, or the potential of both as a unit may be raised or lowered.

What we claim as new, and desire to secure by Letters Patent of the United States, is—

1. In a machine provided with a plurality of commutators, means for adjusting the relative load on the several commutators, comprising a brush-shifter for each, and an indicator showing the relative load condition.

2. In a machine provided with a plurality of commutators, means for adjusting the brushes, and an indicator in circuit jointly with the commutators showing the relative load condition.

3. Means for maintaining an equality of load between two commutators connected in a common circuit, comprising brush-shifting devices for the respective commutators, and an indicating instrument differentially responsive to the two commutators.

4. In an electric generator having two commutators connected with a common circuit, an indicating instrument differentially responsive to the energy delivered by the two commutators, and means for shifting the brushes to properly divide the load.

5. In a dynamo-electric machine having two independent commutators, brush-shifting devices for each commutator, and a differentially-responsive current-indicator in circuit.

6. In a dynamo-electric machine having two independent commutators connecting with different windings, each having adjustable brushes, means for shifting the brushes of the two commutators together or singly, and means for indicating the load relation of the commutators.

7. In a dynamo-electric machine provided with two commutators connected with independent windings, adjustable brushes for each commutator, means for regulating the adjustment, and an instrument within the range of inspection of the operator while adjusting the brushes, said instrument adapted to show the load relation of the two commutators.

8. A dynamo-electric machine provided with two independent commutators connected to separate generating-windings, adjustable brushes for each commutator, handles for regulating the position of the brushes, and a clutch for coupling the handles, whereby the brushes may be simultaneously or separately shifted.

9. In a multipolar dynamo-electric generator, the combination of independent armature-windings, two independent commutators connected therewith, adjustable brushes for the respective commutators, an ammeter in an electric bridge between the leads of the two commutators, and means for adjusting either set of brushes.

10. A dynamo-electric machine provided with two commutators, adjustable brushes for each commutator, means for regulating the position of either set of brushes, and a clutch for coupling the parts to permit control of both sets of brushes by the same agency.

In witness whereof we have hereunto set our hands this 26th day of March, 1900.

EDWARD M. HEWLETT.
HERMANN F. T. ERBEN.

Witnesses:
BENJAMIN B. HULL,
MABEL E. JACOBSON.